United States Patent
Mehrabani et al.

(10) Patent No.: US 12,243,517 B1
(45) Date of Patent: Mar. 4, 2025

(54) UTTERANCE ENDPOINTING IN TASK-ORIENTED CONVERSATIONAL SYSTEMS

(71) Applicant: Interactions LLC, Franklin, MA (US)

(72) Inventors: Mahnoosh Mehrabani, North Bethesda, MD (US); Srinivas Bangalore, Morristown, NJ (US)

(73) Assignee: Interactions LLC, Franklin, MA (US)

( * ) Notice: Subject to any disclaimer, the term of this patent is extended or adjusted under 35 U.S.C. 154(b) by 120 days.

(21) Appl. No.: 17/500,834

(22) Filed: Oct. 13, 2021

(51) Int. Cl.
*G10L 15/18* (2013.01)
*G10L 15/02* (2006.01)
*G10L 15/06* (2013.01)
*G10L 15/08* (2006.01)

(52) U.S. Cl.
CPC .......... *G10L 15/1815* (2013.01); *G10L 15/02* (2013.01); *G10L 15/063* (2013.01); *G10L 15/083* (2013.01); *G10L 15/1807* (2013.01); *G10L 2015/0636* (2013.01)

(58) Field of Classification Search
None
See application file for complete search history.

(56) References Cited

U.S. PATENT DOCUMENTS

| | | | |
|---|---|---|---|
| 10,102,851 B1 * | 10/2018 | Kiss | G10L 15/05 |
| 10,134,425 B1 * | 11/2018 | Johnson, Jr. | G10L 15/05 |
| 10,923,111 B1 * | 2/2021 | Fan | G10L 15/16 |
| 2013/0060570 A1 * | 3/2013 | Williams | G10L 15/063 |
| | | | 704/E15.001 |
| 2015/0269949 A1 * | 9/2015 | Chang | G10L 19/005 |
| | | | 704/201 |
| 2017/0025119 A1 * | 1/2017 | Song | G10L 15/197 |
| 2018/0350395 A1 * | 12/2018 | Simko | G10L 15/187 |

(Continued)

OTHER PUBLICATIONS

Maas, Roland, et al. "Combining acoustic embeddings and decoding features for end-of-utterance detection in real-time far-field speech recognition systems." 2018 IEEE International Conference on Acoustics, Speech and Signal Processing (ICASSP). IEEE, 2018. (Year: 2018).*

(Continued)

*Primary Examiner* — Douglas Godbold
(74) *Attorney, Agent, or Firm* — Fenwick & West LLP (57) ABSTRACT

A task-oriented dialog system determines an endpoint in a user utterance by receiving incremental portions of a user utterance that is provided in real time during a task-oriented communication session between a user and a virtual agent (VA). The task-oriented dialog system recognizes words in the incremental portions using an automated speech recognition (ASR) model and generates semantic information for the incremental portions of the utterance by applying a natural language processing (NLP) model to the recognized words. An acoustic-prosodic signature of the incremental portions of the utterance is generated using an acoustic-prosodic model. The task-oriented dialog system can generate a feature vector that represents the incrementally recognized words, the semantic information, the acoustic-prosodic signature, and corresponding confidence scores of the model outputs. A model is applied to the feature vector to identify a likely endpoint in the user utterance.

20 Claims, 4 Drawing Sheets

(56) References Cited

U.S. PATENT DOCUMENTS

| | | | |
|---|---|---|---|
| 2020/0175961 A1* | 6/2020 | Thomson | G10L 15/28 |
| 2020/0357412 A1* | 11/2020 | Robert Jose | G10L 15/1815 |
| 2021/0004542 A1* | 1/2021 | Yun | G06F 40/47 |
| 2021/0035558 A1* | 2/2021 | Nakamura | G10L 15/16 |
| 2021/0104236 A1* | 4/2021 | Doggett | G10L 15/1822 |
| 2021/0118426 A1* | 4/2021 | Li | G10L 15/04 |
| 2021/0304773 A1* | 9/2021 | Kumar | G06F 3/167 |

OTHER PUBLICATIONS

Hwang, Inyoung, and Joon-Hyuk Chang. "End-to-end speech endpoint detection utilizing acoustic and language modeling knowledge for online low-latency speech recognition." IEEE access 8 (2020): 161109-161123. (Year: 2020).*

* cited by examiner

300 Utterance with various examples of end-pointing

I want to book a flight ... (long pause) from Boston to ... (pause) New York, um no wait to ...

(pause) New Jersey, ... (pause) and ....(car honks)...um.....(noise).... — 320

310 — long pause position; 330 — after "New York"; 340 — after "New Jersey"

310 Traditional end-pointing based on long pause in speech

320 Traditional end-pointing based on a pre-defined timeout

330 End-pointing based only on NLU results/completeness

340 Proposed end-pointing based on prosody and NLU results

UTTERANCE ENDPOINTING IN TASK-ORIENTED CONVERSATIONAL SYSTEMS

FIELD OF ART

This disclosure relates generally to the fields of spoken language processing and natural language processing, and more specifically, to use of machine learning techniques to determine an endpoint within a user utterance.

BACKGROUND

Tasks such as making an appointment or exchanging a product can be completed using a virtual agent (VA), a natural language processing service that determines intention and meaning behind a user's utterances and that can synthesize response utterances to provide an interactive conversation between human and VA. In the interactive conversation, the human and VA interact in "turns," where the human and VA alternate in turns to provide natural language utterances in a dialog. In each "turn" of the conversation, the goal of the virtual agent is to extract proper information to complete the desired task. One of the main challenges for the VA is deciding when the required information has been captured to proceed to the next turn in the conversation. The point in time at which this information has been captured and the VA can act next is called an "endpoint" and the process of determining when it has been reached is called "endpointing." Many traditional VAs use a fixed timeout (i.e., the utterance will be endpointed after a predefined time) that is set heuristically. Because different people talk at different speeds and levels of verbosity, this approach results in suboptimal transitioning or endpointing of the utterances in each turn. As a result, with traditional systems, a speaker may still be talking when the VA interrupts them. This decreases the accuracy of the VA's natural language processing since relevant information from the end of the user's utterance is not captured. Other traditional systems may implement a long timeout period rather than a short timeout period, which causes the VA to listen long after the speaker is finished. This unnecessarily expends processing and power resources to capture and process sound that does not contain information (e.g., background noise). This can also decrease the accuracy of the VA's natural language processing (e.g., a nearby conversation is captured and causes the VA to misunderstand the user's utterance). Additionally, this approach causes longer delays before the VA responds, which detracts from the user experience. Other approaches may be limited to using acoustic prosodic evidence (e.g., a long pause), which is also suboptimal when the speaker pauses to remember the required information but is not actually done with their turn in the conversation. This may cut the speaker off before the speaker can finish their thought, and also decreases the accuracy of the VA's natural language processing since relevant information from the user's utterance is not captured.

SUMMARY

A task-oriented dialog system described herein takes advantage of the goal-oriented aspect of conversations between humans and VAs to improve turn-taking in speaking by using incrementally captured semantic meaning in addition to acoustic and prosodic evidence of user utterances. This task-oriented dialog system is also referred to herein as an "endpointing system." The endpointing system also determines an incremental confidence score that indicates the degree of certainty of the information that has been captured in the utterance increments to fulfill the desired task. The confidence score may be based on spoken language that combines speech recognition scores with natural language processing scores incrementally as the utterance is analyzed. The captured information from the previous turns in the conversation is also considered (e.g., for semantic meaning related to context resolution). A model is applied to the incrementally captured semantic meaning, acoustic prosodic evidence, recognized speech, and incremental confidence scores to determine whether an endpoint has been reached in a user utterance (e.g., in real time as the utterance is being received). The model can be a machine learning model, and the endpointing system can select a particular machine learning model among various models tailored to conversational domains (e.g., conversations with similar tasks, occurring within similar locations, captured by a similar device type, etc.). The determined endpoint of a model trained for a specific conversational domain can be more accurate than a model trained using general conversation data. By increasing the accuracy with which an endpoint can be detected in real time while a user is interacting with a VA, the endpointing system can determine when to act next without interrupting the user or recording uninformative noise after the user has finished speaking. Accordingly, the endpointing system efficiently uses processing and power resources, which may be particularly limited and valuable with mobile devices where VAs are often utilized, and increases the accuracy of the endpoint determination.

In one embodiment, an endpointing system determines an endpoint in a user utterance by receiving incremental portions of a user utterance that is provided in real time during a task-oriented communication session between a user and a VA. The endpointing system recognizes words in the incremental portions using an automated speech recognition (ASR) model and generates semantic information for the incremental portions of the utterance by applying a natural language processing (NLP) model to the recognized words. An acoustic-prosodic signature of the incremental portions of the utterance is generated using an acoustic-prosodic model. The endpointing system can generate a feature vector that represents the incrementally recognized words, the semantic information, and the acoustic-prosodic signature. The feature vector can additionally represent confidence scores associated with the outputs determined by the ASR, NLP, and acoustic-prosodic models. A model that is trained to determine a confidence score associated with identifying an endpoint in a given portion of a user utterance (e.g., a particular increment), is applied to the feature vector to identify a likely endpoint in the user utterance. If the confidence score meets or exceeds a threshold score that indicates that the given portion of the user utterance includes the endpoint of the user utterance, the system causes the VA to generate a response utterance to respond to the user in the task-oriented communication session.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

Figure 1:
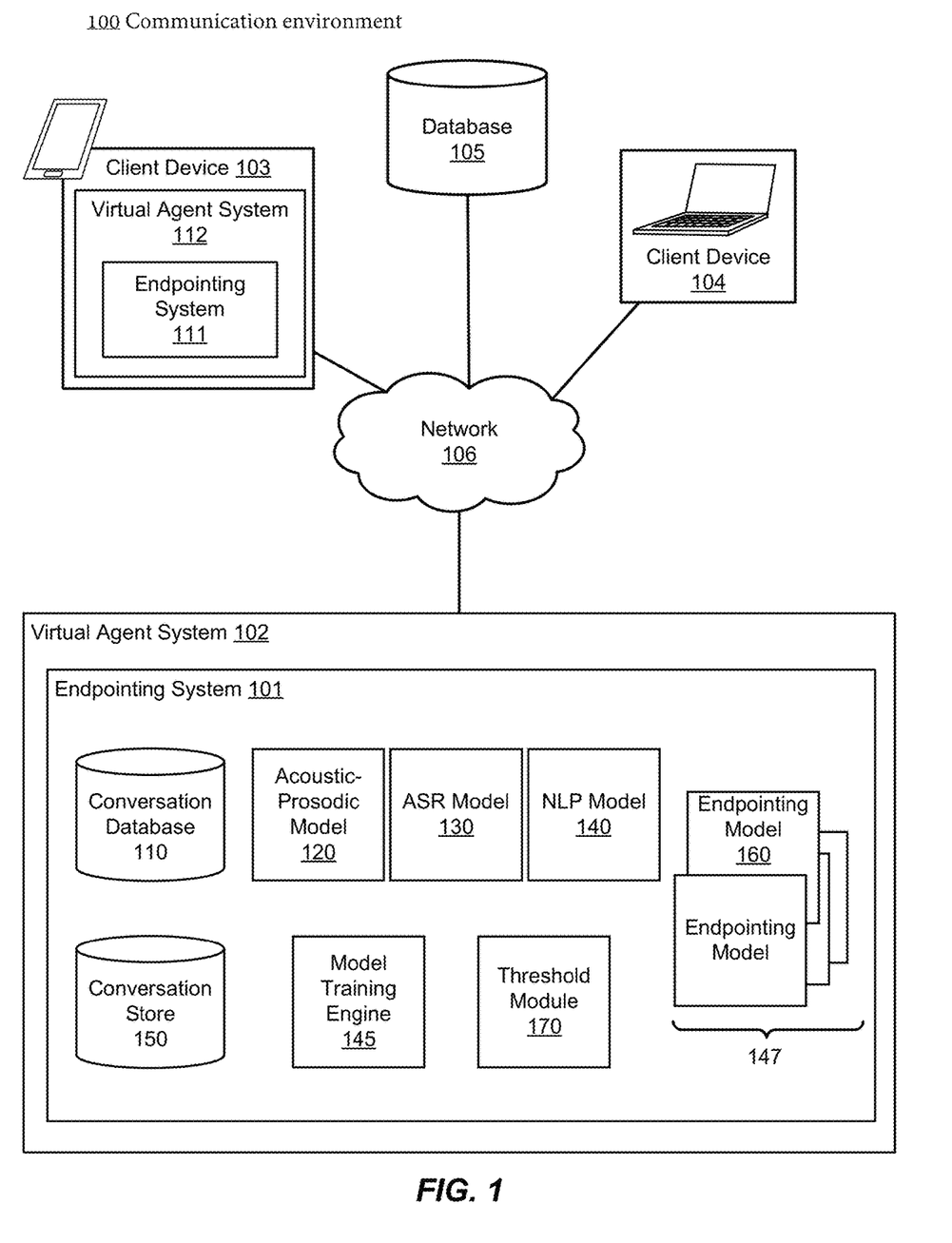
FIG. 1 is a networking diagram illustrating a communication environment in which an endpointing system operates, according to some embodiments.

FIG. 1 is a networking diagram illustrating a communication environment 100 in which an endpointing system 101 operates, according to some embodiments. The communication environment 100 includes the endpointing system 101, which is a component of a virtual agent system 102, client devices 103 and 104, an endpointing system 111, a virtual agent system 112, a database 105, and a network 160. In alternative configurations, different, fewer, and/or additional components may be included in the communication environment 100. The endpointing system 101 processes natural language (e.g., user utterances) within media (e.g., audio or video) in a task-oriented conversation. The endpointing system 101 illustrated in FIG. 1 determines an endpoint within a user utterance received in a task-oriented conversation. The endpointing system 101 may use one or more endpointing models (e.g., machine-learned models) to determine that an endpoint of a user utterance has been reached as incremental portions of the utterance are processed. The endpointing system 101 can be used as a component of a larger natural language processing environment, such as a component of a server providing virtual agent (VA) services to client devices over a wide-area computer network such as the Internet. While the endpointing system may be stored and executed on a remote server, similar systems may also be executed locally at client devices. For example, the endpointing system 111 and the virtual agent system 112 are stored and executed locally on the client device 103.

The endpointing system 101 uses a combination of speech attributes and confidence scoring to determine an endpoint in a user utterance. Speech attributes are characteristics of a user utterance derived from a recorded audio utterance and may include acoustic, prosodic, and semantic attributes, recognized speech, or any other suitable characteristic of speech that can be derived from a user utterance. The endpointing system 101 includes a conversation database 110, an acoustic-prosodic model 120, an automated speech recognition (ASR) model 130, a natural language processing (NLP) model 140, a model training engine 145, various trained models 147 (including endpointing model 160), and a threshold module 170. In alternative configurations, different, fewer, and/or additional components may be included in the endpointing system 101.

The endpointing system 101 processes a user utterance in increments such that the speech attributes reflect characteristics of increments in the user utterance. An increment may be any portion of one or more contiguously received words in a user utterance. For example, the user utterance of "Find me a coffee shop in (pause) Washington DC (pause) that is open at 5 AM" may be demarcated at word-level increments (e.g., "Find," "Find me," "Find me a," etc.) or at pause-level increments (e.g., "Find me a coffee shop in," "Find me a coffee shop in Washington DC," and "Find me a coffee shop in Washington DC that is open at 5 AM"). Increments of increasing word count with consecutive words or groups of words may be referred to herein as "increment steps." In examples of user utterances presented herein, parentheticals refer to audio or lack thereof as indicated in the parenthetical, rather than, for example, a user saying the word "pause" to a VA. The endpointing system 101 may process each increment or selectively process increments. In one example of selectively processing increments, the endpointing system 101 may receive a user utterance "What is the weather like in San Francisco? Nevermind. (pause) What is the weather like in Oakland?" and process the increment of "What is the weather like in Oakland" and ignore the increment of "What is the weather like in San Francisco? Nevermind." after detecting "nevermind" in the utterance and determining to process the portion of the utterance after "nevermind."

The endpointing system 101 may determine speech attributes of user utterance increments. Speech attributes are characteristics of a user utterance derived from a recorded audio utterance (e.g., a real time recording of a user's utterance). Speech attributes can include recognized speech in utterance increments, acoustic-prosodic attributes, or semantic attributes of the increments. Acoustic-prosodic attributes may also be referred to herein as "acoustic-prosodic signatures." An acoustic-prosodic attribute may be an acoustic or prosodic characteristic of the audio such as the frequency of words spoken per minute, pitch, intonation, stress, volume, or any other characteristic the manner in which speech is delivered. A semantic attribute is a characteristic of one or more words that represents the meaning or intention communicated through the one or more words. A semantic attribute may be a speaker's mood or emotional state, disfluencies, nonliteral language (e.g., irony), attentional state (e.g., a present topic of interest that a user may refer back to using anaphora), named entities, anaphora, context, intention, topic relationships, deixis, ellipsis, components of grammar, or any suitable data derived from recognized speech for determining a meaning or intent of the speech. The endpointing system 101 may score each determined speech attribute with a confidence score indicating an accuracy of the determined speech attribute.

In one non-limiting example of a task-oriented conversation involving the endpointing system 101, a user interacts with a VA to request information on services within a particular region. The endpointing system 101 receives a first user utterance of "Show me the bookstores . . . (pause) No. I meant, public libraries in Miami." The endpointing system 101 performs automated speech recognition on the first utterance in pause-level increments, recognizing the words in a first increment of "Show me the bookstores" and the second increment of "Show me the bookstores. No. I meant, public libraries in Miami." The endpointing system 101 determines acoustic attributes of the first and second increments, which indicate that the average decibel level of the first increment is lower than the average decibel of the second increment (e.g., the user spoke louder following "bookstores"). The endpointing system 101 determines prosodic attributes of the first and second increments, which indicate that the speed of speech, of frequency of words per minute spoken, of the second increment is greater than that of the first increment (e.g., the user spoke faster following "bookstores"). The endpointing system 101 determines semantic attributes of the first and second increments such as parts of speech of "me," "bookstores," and "libraries," named entity of "Miami," semantic relations between objects such as "in" in "libraries in Miami," and descriptive attributes of objects such as "public" in "public libraries." Determined semantic attributes can further include context such as a requesting user (e.g., "me"), an object of interest (e.g., "libraries"), and a location of interest (e.g., "Miami"), which may be stored in a short term memory by the endpointing system 101 for reference when processing subsequently received user utterances.

Continuing the previous example, the endpointing system 101 may score the determined speech attributes, where the scores represent an accuracy of the determined attribute (i.e., a confidence score). For example, the acoustic-prosodic attribute of the volume may have a confidence score of 85%, and the semantic attribute of the recognized named entity may have a confidence score of 80%. The endpointing system 101 may generate a numerical representation of the speech attributes and corresponding scores (e.g., a feature vector). An endpointing model is applied to the numerical representation to determine an endpoint and a corresponding confidence score. One or more endpointing models may be maintained and/or accessed by the endpointing system 101, where the models can be tailored to different domains (e.g., categories of conversation by common features) for increased accuracy. The endpointing system 101 compares the confidence score output by the endpointing model to a threshold confidence score to determine whether the corresponding endpoint is indeed a point in the user utterance where the user has ended their turn and is anticipating a response from the VA. The endpointing system 101 may determine that the endpoint follows the second increment of "Show me the bookstores. No. I meant, public libraries in Miami." and cause the virtual agent system 102 (e.g., the dialog manager) to query and display a list of public libraries in Miami to the user (e.g. on the client device 104).

In further reference to the example described above, the user may provide a second user utterance after (e.g., immediately after) the VA presents the list of public libraries in Miami. The endpointing system 101 receives the second user utterance of "What about um . . . (pause) Naples (noise)" The endpointing system 101 may similarly determine that the endpoint follows the increment of "What about um Naples" (e.g., without waiting for the received noise to stop) with an additional semantic attribute from the context of the first utterance. In particular, the endpointing system 101 may store semantic attributes, dialogue states, or other derived speech attributes from previously parsed user utterance increments in a short term memory of dialogue history (e.g., stored in the conversation store 150). For example, the location of interest, "Boston," and a dialogue state, "information query," may be stored in the conversation store 150 and used, along with other speech attributes and confidence scores, to generate a second numeral representation of the increment "What about um Naples" to input into an endpointing model. As shown in this example, the endpointing system 101 processes the user utterance in increments, combines various speech attributes and confidence scores derived from the user utterance increments, and uses thresholding to determine the endpoint in the user utterance.

The conversation database 110 stores historical task-oriented conversations (e.g., audio or video). The conversations may be categorized based on a location, task, third party service contacted during the conversation, a language, or any other category of conversation by a common feature. These categories may be referred to herein as "domains." For example, a location domain may categorize a conversation according to a user's country, city, or any other suitable region in which a culture for the region has been established to distinguish it from other regions. The conversations may be categorized into domains to train corresponding models to determine endpoints in conversations that can be similarly categorized. The conversations stored in the conversation database 110 may be used by the endpointing system 101 to develop training sets for the model training engine 145 to train or create a model (e.g., an endpointing model) of the endpointing system 101. For example, the model training engine 145 may use stored conversations of a "United States" location domain to train a first model and conversations of a "United Kingdom" location domain to train a second model. By storing the differently categorized US and UK conversations in the conversation database 110, the endpointing system 101 can tailor two different models to more accurately identify endpoints in conversations occurring in the UK or the US, respectively.

The endpointing system 101 may receive the conversations from publicly available datasets or users of the endpointing system 101 (e.g., authorized recordings of users' conversations). The conversations may be human-human conversations (i.e., a conversation between two humans), human-agent conversations (i.e., a conversation between a human and a VA), or agent-agent conversations (i.e., a conversation between two VAs). The conversations involving at least one VA may or may not be affected by a predetermined timeout. For example, the conversation database 110 may store a conversation between a user and a VA that allowed the user to pause between user utterances without the VA generating a speech prompt after a predefined time since the user's pause began. A conversation between a human and a VA may also be referred to as a "communication session."

The acoustic-prosodic model 120 determines acoustic-prosodic attributes of a user utterance and a corresponding confidence score. The term "acoustic-prosodic attribute" refers to either an acoustic or a prosodic attribute. Acoustic attributes characterize physical attributes of the delivery of speech and can include volume and pitch. Prosodic attributes characterize the delivery of speech through data derived from acoustic attributes and can include change in pitch (e.g., intonation), change in volume (e.g., stress), and verbosity (e.g., number of words spoken per minute). The acoustic-prosodic model 120 may use signal processing techniques for modeling the signal characteristics (e.g., change in decibel or frequency of the signal over time). The acoustic-prosodic model 120 may receive, as input, the audio signal of a user utterance or increments of the utterance and output acoustic-prosodic attributes. The acoustic-prosodic model 120 may determine a confidence score indicating an accuracy of the determined acoustic-prosodic attribute. The acoustic-prosodic model 120 may be used to determine acoustic-prosodic attributes for respective increments of the user utterance. For example, the acoustic-prosodic model 120 may receive the recognized words output from the ASR model 130 and associate the acoustic-prosodic attributes to the words or determine that they're associated with indeterminant sounds (e.g., mumbling, filler words like "um," or background noise). The relationship between acoustic-prosodic features and recognized speech or indeterminant sounds may be used by the endpointing system 101 in generating the numerical representation input into an endpointing model of the models 147.

The ASR model 130 recognizes words within a user utterance. In particular, the ASR model 130 performs incremental ASR by recognizing words in increments. For example, a user utterance of "Tell me about the weather in Paris (pause) Texas" may be partitioned into word-level or pause-level increments. The ASR model 130 may recognize words in the word-level increments of "Tell," "Tell me," "Tell me about," etc. or in the pause-level increments of "Tell me about the weather in Paris" and "Tell me about the weather in Paris, Texas." The ASR model 130 receives, as input, the audio signal of a user utterance or increments thereof and outputs a string of one or more recognized words in the audio signal. The recognized words may be provided to the acoustic-prosodic model 120, the NLP model 140, or the model training engine 145. The incremental ASR contributes to how the endpointing system 101 is able to process user utterance increments rather than wait for a timeout period that can be too short and cut off a user or too long and consume extra processing resources to analyze audio long past the user's last word (which also causes frustration to the waiting user). This is one of the benefits that the endpointing system described herein provides over conventional natural language processing systems that rely on predefined timeout periods.

In some embodiments, the endpointing system 101 determines whether to analyze increments at a word-level or at a pause-level before applying the ASR model 130 to the increments. The endpointing system 101 may, by default, analyze user utterances at pause-level, but determine to switch to word-level if the accuracy of the determined endpoints using pause-level increments is low. The endpointing system 101 may determine that the accuracy of the determined endpoints is low based on user feedback of the VA's responses to the user (e.g., response utterances or tasks executed), the number of conversational turns (i.e., one user utterance and one response utterance makes one conversational turn) taken before a VA executed a user's task successfully, a ratio of successfully executed tasks to unsuccessfully executed tasks, or any other suitable metric representing the VA's performance quality in executing tasks in a task-oriented conversation system. As referred to herein, a "response utterance" is speech synthesized by the VA based on the determined endpoint and semantic attributes of a user utterance and provided to the user (e.g., through a client device's speakers) while executing a task for the user. For example, the endpointing system 101 may determine to switch from a default pause-level incrementing to word-level incrementing responsive to the number of conversational turns taken to successfully execute a user's task exceeding an average number of conversational turns for the given task or task type (e.g., reserving an airline ticket may require an average of eight turns by the virtual agent system 102 and a task type of making a reservation may require an average of five turns). For subsequently received user utterances during a task-oriented conversation, the endpointing system 101 may use word-level increments. In this way, the endpointing system 101 may adapt to a speaking style of a user (e.g., users who pause while speaking or speak in one breath without pauses).

The NLP model 140 determines semantic attributes of a user utterance using the recognized words of the user utterance. Semantic attributes are data derived from recognized speech for determining a user utterance's meaning and can include a speaker's mood or emotional state, disfluencies, nonliteral language (e.g., irony), attentional state (e.g., a present topic of interest that a user may refer back to using anaphora), named entities, anaphora, context, intention, topic relationships, deixis, ellipsis, components of grammar, or any suitable data derived from recognized speech for determining a meaning of the speech. For example, the semantic attributes may include sentence grammar such as clauses, topics, predicates, subjects, objects, prepositions, verbs, adverbs, adjectives, etc. The NLP model 140 may perform named entity recognition using machine learning to identify subjects and objects in sentences. The subjects and objects may be further categorized into locations, times, pronouns, proper nouns, etc. The verbs can be further categorized into an action type (e.g., "show," "explain," "find," "call," etc.). The NLP model 140 can also output relationships between the semantic attributes. For example, an adjective may be linked to the object it describes. The NLP model 140 may determine semantic attributes for user utterance increments in addition or alternatively to determining them for a whole user utterance.

The NLP model 140 may be a machine-learned model, deep learning model, a statistical model, or a combination of models. Different models in a combination of models may be used to determine different semantic attributes. For example, the NLP model 140 may be a combination of an n-gram model to resolve an unknown or missing word, a neural network configured to understand emotion in text, a first machine-learned model for classifying parts of speech (POS), and a second machine-learned model for resolving anaphora. The NLP model 140 may access historical user utterances stored in the conversation store 150 to refer back to previously determined entities to determine semantic attributes (e.g., for anaphora or deixis resolution).

The models 147 can be tailored to different domains including geographical domains, task-based domains, or any suitable categorization of user utterances by a common feature. For example, the endpointing system 101 may maintain various models for detecting endpoints in a task-based domain such as a domain for reserving airline tickets, a domain for requesting weather information, a domain for telehealth, a domain for navigation, or any suitable combination thereof. The endpointing system 101 may access a dialog history that includes historical user utterances (e.g., from the conversation store 150). The dialog history can be annotated with corresponding semantic information for the historical user utterances. For example, a historical user utterance of "Show me the Giants game score" is stored in the conversation store 150 and annotated with semantic attributes such as recognized named entities (e.g., "Giants"), parts of speech (e.g., pronoun, noun, and verb), and relationship between parts of speech (e.g., "show" is verb applied to the noun "score"). The annotated semantic attributes and the user utterances may be stored as short term memory in the conversation store 150 of the agent system 102.

The semantic attributes output by the NLP model 140 may be used to determine context of the task-oriented conversation, which may be used to determine which endpointing model of the models 147 to select and determine the endpoint in a user utterance. For example, the endpointing models 147 may be categorized based on domains, where each domain relates to a context of a user utterance. The endpointing system 101 can select one of the domain-based models according to the determined context. Context can be determined using the user utterance, historical user utterances, a user's profile, real world knowledge, or a combination thereof. For example, semantic attributes of a first user utterance "Show me the Giants game score" includes a named entity of a sports team; however, both the New York Giants and the San Francisco Giants have the same team name. The NLP model 140 may use real world knowledge such as the user's current location (e.g., using GPS data or an IP address to indicate the location) for the virtual agent to fulfill the user's task with the most likely team the user is referring to. For example, if the user's IP address indicates the user is located in Mountain View, California, the NLP model 140 might use a statistical model to determine that the user is most likely requesting the score for the San Francisco Giants. In this example, the endpointing system 101 has determined semantic attributes including identifying a named entity, an action type, and a user using the recognized words (e.g., by the ASR model 130) "Giants," "show," and "me," respectively. In this example, the endpointing system 101 may determine that the endpoint follows the word "score" rather than the word "Giants" using an endpointing model of the models 147 for a sports and entertainment domain selected based on the named entity of "Giants."

Continuing the previous example where context is determined in task-oriented conversations, sometime later, the endpointing system 101 may receive a second user utterance of "What's the score now?" The system may determine the context of the second utterance using the first user utterance of "Show me the Giants game score" that was stored by the endpointing system 101 in the conversation store 150. Based on the previously determined context of sports and entertainment and previously recognized words in the first utterance, the NLP model 140 may determine that the current context for the word "score" relates to the Giants score. With the determined context of the second user utterance, the endpointing system 101 may determine that the endpoint is after the user says "now," and will not wait for the user to say more before providing the current baseball score to the user.

The model training engine 145 trains the one or more endpointing models 147 to determine an endpoint in a user utterance based on speech attributes and corresponding confidence scores. The endpointing models 147 trained by the engine 145 may be a machine-learned model, statistical model, or any suitable model dependent on the probability of a relationship between a user utterance and a location of an endpoint. In some embodiments, the model training engine 145 trains machine-learned models in addition to the endpointing models 147. In an example where the NLP model 140 is a machine-learned model, the model training engine 145 trains the NLP model 140 to determine semantic attributes of user utterances. The model training engine 145 in FIG. 1 is depicted as being stored and executed in a remote server that is communicatively coupled to the client devices 103 and 104 through the network 106. While the endpointing system onboard the client device 103 may also have a model training engine configured to function in a manner similar to the remotely managed model training engine 145, versions of the endpointing system executed by mobile devices may exclude the model training engine and instead rely upon a remote server to train the endpointing models to conserve processing resources.

The model training engine 145 can train the models 147 using historical conversation data in the conversation database 110 (e.g., previous human-agent task-oriented conversations). The historical conversations may have occurred with or without a timeout limit. The timeout limit is used by a VA to determine that an endpoint has been reached after a predetermined period of time has passed since a user's last utterance. For example, a timeout limit of 15 seconds can cause a VA to provide a response utterance or execute a task at 15 seconds after the user's last utterance was received by the VA. In some embodiments, historical conversation data of conversations without a timeout limit or a longer timeout limit is preferred for training. The conversations may be annotated with metadata such as user information (e.g., location, age group, gender), device information (e.g., device type, device operating system, or other device hardware features), a software application in which the agent was accessed (e.g., navigation, entertainment, news, etc.), or any other suitable information providing context for the conversation. The endpointing system 101 may use the metadata of the historical conversations to determine which conversations to use to train an endpointing model, saving processing resources by not using all conversations and creating a more accurate model that is tailored to particular conversation features. For example, the system trains one model to identify endpoints using conversations involving Denver users and another model using conversations involving Houston users. The first model may produce a higher accuracy of endpoint determination when used for users in Houston than for users in Denver (e.g., due to commonly used named entities or speaking mannerisms in Houston as reflected in the historical conversations). The task-oriented conversations may include utterances exclusively from users within a geographical region or age group. For example, a first subset of conversations may be from users only in Houston and a second subset of conversations may be from users who are 18-28 years old.

The model training engine 145 may train a machine learning model in multiple stages. In a first stage, the model training engine 145 may use historical conversations collected across one or more users and derived speech attributes to train a machine learning model. This data from a population of users may be referred to as "general data" or "generalized data." The model training engine 145 may label the general data with whether an endpoint is present or not. A historical user utterance can be partitioned into increments and each increment is labeled with whether an endpoint is present. For example, a historical utterance of "Play the song 'I Will Always Love You' by Dolly Parton" may be partitioned into increments of "Play the song," "Play the song 'I Will Always Love You'," and "Play the song 'I Will Always Love You' by Dolly Parton," where the third increment is labeled as having an endpoint and the first two increments are not. The model training engine 145 creates a first training set based on the labeled general data. The model training engine 145 trains a machine learning model, using the first training set, to identify an endpoint in a user utterance. In some embodiments, the machine learning model is configured to receive, as an input, a user utterance in a task-oriented conversation with the virtual agent system 102, and to output a confidence score associated with the identification of the utterance's endpoint.

In a second stage of training, the model training engine 145 can use user-specific conversations with the virtual agent system 102. The user-specific conversations can be recorded by a microphone of the user's device (e.g., the client device 103 or 104). The model training engine 145 creates a second training set based on previously determined endpoints identified in the user-specific conversations (i.e., the user-specific data) and the corresponding speech attributes, scores, and utterances used (e.g., by the model trained in the first stage) to determine the endpoints. The determined endpoints, depending on the success of the virtual agent's interactions with the user (e.g., as indicated by user feedback or number of conversational turns needed to execute the user's task), may serve as labels for the user-specific data. If a previously determined endpoint resulted in task execution that was successful, efficient, or otherwise evoked a positive feedback from the user, the model training engine 145 may create the second training set that includes user-specific data labeled to indicate the endpoint was correctly identified in a user utterance increment. The model training engine 145 then re-trains the machine learning model using the second training set such that the machine learning model is customized to the user (e.g., speaking mannerisms, frequently executed tasks, etc.). Although multiple training stages are described herein, a machine-learned model of the models 147 may be trained with only a single stage.

In an example of a second stage of training that continues the example presented with respect to the first stage of training, the endpointing system 101 may receive a user utterance from the client device 103 of "Play the song 'I Will Always Love You.'" and due to the first stage of training against historical conversations with users who had requested the rendition by Dolly Parton, determine that no endpoint is present and that the user has not finished speaking. The system may determine an endpoint after a predefined timeout period for a pause e.g., 10 seconds, and prompt the user for additional information with a response utterance (e.g., "Did you want Dolly's or Whitney's?"). The user may then provide another user utterance specifying Whitney Houston's rendition. The endpointing system 101 may determine that the number of conversational turns is above average for the type of task and thus, an inefficient determination of an endpoint. Alternatively or additionally, the endpointing system 101 may receive user feedback that the experience was bad because the user waited too long for the agent to provide a response utterance. The endpointing system 101 may use either the determination of inefficiency or the user's feedback to create the second training set. The re-trained model can produce an improved endpoint determination for subsequent and similar requests, determining that the user's preference is for a particular artist and play back the song without waiting for the user to specify the artist. Accordingly, the endpointing system 101 improves the accuracy of a model by using multi-stage training.

To create a training set, the model training engine 145 may determine one or more numerical representations associated with user utterances (e.g., of a whole user utterance or an increment of the user utterance). A numerical representation may be a feature vector having dimensions representing different speech attributes such as acoustic-prosodic attributes, semantic attributes, or recognized words and/or representing confidence scores associated with the determined speech attributes. For example, the model training engine 145 may determine a feature vector characterizing the user utterance of "Play the song 'I Will Always Love You.'" that includes acoustic-prosodic attributes like the speed at which the request is spoken, semantic attributes such as the named entity for the song title, the recognized words, and corresponding confidence scores. The model training engine 145 may label the numerical representations and generate the training set using the labeled numerical representations.

In some embodiments, the model training engine 145 may train a model on speech attributes and confidence scores associated with user utterance increments. For example, the model training engine 145 may determine a first feature vector for the increment "Play the song" and a second feature vector for the increment "Play the song 'I Will Always Love You.'" The first feature vector may include the recognized words of the first increment, the confidence score for the recognized words, a speed at which the words are spoken, a confidence score for the speed, a dialog state of determining a song for playback, a confidence score for the dialog state, an anaphora of "the song," and a confidence score for the anaphora (e.g., a low confidence score due to no prior user utterance indicating what the anaphora refers back to). The use of confidence scores for user utterance increments may be referred to herein as "incremental confidence scoring." The second feature vector may include similar types of speech attributes and may not include an attribute for an anaphora since the song title can be identified within the second increment, without referring back to a prior utterance. The first and second feature vectors may be labeled according to whether there is an endpoint in the corresponding utterance increment. For example, the first feature vector may be labeled to indicate there is no endpoint and the second feature vector may be labeled to indicate there is an endpoint. The two labeled feature vectors may be used in a training set to train a machine-learned model.

In some embodiments, the model training engine 145 receives feedback of the conversation held with the VA indicating a measure of approval that the user has with the determined endpoint. For example, the user may provide feedback through a GUI, where the feedback is an approval or rejection of the action executed by the VA to fulfill the user's request. The model training engine 145 may modify an association between the determined endpoint and the speech attributes that were used to determine the endpoint. For example, in response to the user providing a measure of approval indicating disapproval, the model training engine 145 reduces a weight applied to speech attributes also used to determine the endpoint that led to the user disapproving the conversation. If the speech attributes were an acoustic-prosodic attribute of a volume of the user and semantic attributes reflecting the context of the user utterance, the model training engine 145 may reduce weights of the respective attributes for generating subsequent feature vectors. When the modified association including the reduced weight is used to retrain a machine-learned model, the model training engine 145 may cause the likelihood of subsequent similar endpoint determinations based on acoustic-prosodic attributes based on volume and semantic attributes based on context to decrease.

The endpointing model 160 may be a machine-learned model, statistical model, rules-based model, or any other suitable model for determining an endpoint in a user utterance and a likelihood that the determined endpoint is indeed the user's intended end of their turn (e.g., a confidence score). The endpointing model 160 may receive, as input, speech attributes and confidence scores (e.g., within a feature vector) and output a determination of an endpoint and corresponding confidence score. In some embodiments, the endpointing system 101 selects the endpointing model 160 from the endpointing models 147 based on a determined domain in which the user utterance belongs. For example, the endpointing model 160 is in the domain of airline ticket reservation and the endpointing system 101 selects the model 160 because the determined dialog state is reserving a plane ticket for the user. The endpointing model 160 may be trained by the model training engine 145.

In a first example of a type of model that the endpointing system 101 may apply, the endpointing model 160 is a machine-learned model trained using labeled representations of user utterances (e.g., speech attributes and confidence scores) to determine whether an endpoint is present in an increment of a user utterance. The endpointing model 160 may output a confidence score indicating a likelihood that the determined endpoint is the actual end of the user utterance as intended by the user. For example, the endpointing model 160 may indicate that an increment of "Show me" has an endpoint with a confidence score of 5%, an increment of "Show me the movies" has an endpoint with a confidence score of 15%, and an increment of "Show me the movies playing in the theaters now" has an endpoint with a confidence score of 90%. The endpointing system 101 may apply one or more machine-learned models for determining an endpoint and confidence in a particular domain. For example, the endpointing model 160 may be a machine-learned model in the domain of entertainment. The endpointing system 101 may apply another endpointing model of the models 147 that is in a different domain (e.g., navigation) and determine different confidence scores. Following the previous example, the model in the navigation domain may indicate that the increment of "Show me the movies" has an endpoint with a confidence of 70% and "Show me the movies playing in theaters now" has an endpoint with a confidence of 60%. The endpointing system 101 may determine to act upon the endpoint determination that has the highest confidence score. Continuing the previous example, the system determines that the endpoint is after "now" since the confidence score output by the entertainment domain model was 90%, which is higher than the confidence scores output by the both the entertainment domain and navigational domain models.

Machine learning models of the endpointing system 101 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

In a second example of a type of model that the endpointing system 101 may apply, the endpointing model 160 may be a statistical model generated based on previously received user utterances, including derived speech attributes and confidence scores, and corresponding determined endpoints. Feature vectors of the speech attributes and confidence scores may also be used with the statistical model. The endpointing model 160 may determine a likelihood that a feature vector represents a user utterance that has an endpoint.

In a third example of a type of model that the endpointing system 101 may apply, the model described herein may be a rules-based decision model that determines whether an endpoint is present based on a test of various rules or conditions. In some embodiments, the endpointing model 160 is a rules-based model that specifies an endpoint is present in a user utterance increment based on values of the speech attributes or confidence scores satisfying one or more tests. For example, a test of the rules-based model specifies that an endpoint is present in an utterance increment if the acoustic-prosodic attribute for the user's pitch rises at the end of the increment. The endpointing system 101 may evaluate multiple tests and weigh each test's result to determine a confidence score that an endpoint is present in a given user utterance increment.

The threshold module 170 compares the confidence score output by an endpointing model (e.g., the endpointing model 160) to a threshold confidence score to determine whether the determined endpoint is indeed the endpoint. If the confidence score output by the endpointing model 160 meets or exceeds a threshold score indicating that the given portion of the user utterance is the endpoint of the user utterance, the endpointing system 101 may cause the VA to generate a response utterance to respond to the user or execute a task for the user (e.g., reserve airline tickets). The threshold module 170 can determine the threshold score based on an annotated evaluation set of utterances, a user-specified accuracy of the trained model (e.g., the endpointing model 160), or a combination thereof. The annotated evaluation set of utterances can include historical utterances labeled in word-level or pause-level increments whether a previous user reached an endpoint at each of the increment steps. An example of the user-specified accuracy of the model can be 90%. Since the endpointing determination described herein is incremental and iterative, the output of the threshold module 170 may cause the endpointing system 101 to process a subsequent user utterance increment. If the confidence score fails to meet the threshold score, the endpointing system 101 may receiving an additional incremental portion of the user utterance to determine, using the endpointing model 160, whether the additional incremental portion has the endpoint of the utterance. The endpointing system 101 may generate a second feature vector using the received additional incremental portion and apply the trained model to the second feature vector to determine that the additional incremental portion includes the endpoint of the user utterance. The failure to meet the threshold score may indicate that the likelihood that the given portion of the user utterance does not include the endpoint of the utterance.

The virtual agent system 102 is task-oriented natural language service that can hold conversations with users to fulfill the user's tasks. Examples of virtual agents include agents from external systems such as Avaya™, Genesys™, Zendesk™, Nice™, and CallMiner™. The virtual agent system 102 may include the endpointing system 101, a dialog manager for determining and following a series of steps to perform a task for a user, and a speech generation system for synthesizing and outputting response utterances in a voice and/or personality of the virtual agent. The endpointing system 101 may cause the VA to generate a response utterance (e.g., a clarifying question, an instruction to provide more information, or a confirmation that the user utterance was correctly understood). The virtual agent system 102 may determine the response utterance using a dialog manager of the system 102 (i.e., the task-oriented dialog system). The dialog manager can be configured to receive an indication that the endpoint has been reached and based on a dialog history of the VA with the user, to determine the response utterance and/or to execute a task requested by the user.

The client devices 103 and 104 are computing devices capable of receiving user input as well as transmitting and/or receiving data via a network (e.g., network 106). In some embodiments, the client devices 103 and 104 are conventional computer systems, such as a desktop or a laptop computer. Alternatively, the client devices 102 and 103 may be devices having computer functionality, such as a smart-phone, tablet, gaming system, smart TV, or another suitable device. The client devices 103 and 104 may be configured to communicate with the endpointing system 101 via network 106, for example, using a native application executed by the client device 103 or 104 or through an application programming interface (API) running on a native operating system of the client device 103 and 104, such as IOS® or ANDROID™. For example, the client device 103 may use a native application for the virtual agent system 112 and operates the endpointing system 111 locally on processors of the client device 103 (e.g., offline from the network 106). In another example, the client device 104 may use a healthcare application that interfaces with the virtual agent system 102 and the endpointing system 101 (e.g., through an API of the endpointing system 101) to provide speech-assisted services (e.g., a user with poor eyesight may use the virtual agent to request that their prescriptions be refilled). Either client device 103 or 104 may be a computing device that includes the components of the machine depicted in FIG. 4.

The database 105 stores previously received user utterances. In particular, the conversation store 150 may serve as short term memory for task-oriented conversations with a particular user. This short term memory may be used to determine the context of a user utterance, determine and/or track the dialog state over time, or another feature of task-oriented conversations that develop over time. The endpointing system 101 may delete the contents of the short term memory after a predefined number of historical user utterances are stored in the database 105 (e.g., thirty utterances) or after a predefined time expires (e.g., an hour). The naming of "short term memory" is attributed to the contents of the memory being periodically cleared. The use of short term memory may conserve storage resources, and may also be used in other databases described herein (e.g., the conversation data store 150). The user utterances stored in the conversation store 150 may be annotated with speech attributes determined by the acoustic-prosodic model 120, the ASR model 130, or the NLP model 140. The stored utterances may also be annotated with identification metadata such as the client device from which the user utterance was received, a location of the user when the utterance was received, an age group of the user who provided the utterance, or any other suitable information that may link the user utterance to a user, user type, a device, or a device type.

The network 106 may serve to communicatively couple the client devices 103 and 104, the database 105, and the endpointing system 101. In some embodiments, the network 106 includes any combination of local area and/or wide area networks, using wired and/or wireless communication systems. The network 106 may use standard communications technologies and/or protocols. For example, the network 106 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 106 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 106 may be represented using any suitable format, such as hypertext markup language (HTML) or extensible markup language (XML). In some embodiments, all or some of the communication links of the network 106 may be encrypted using any suitable technique or techniques.

Figure 2:
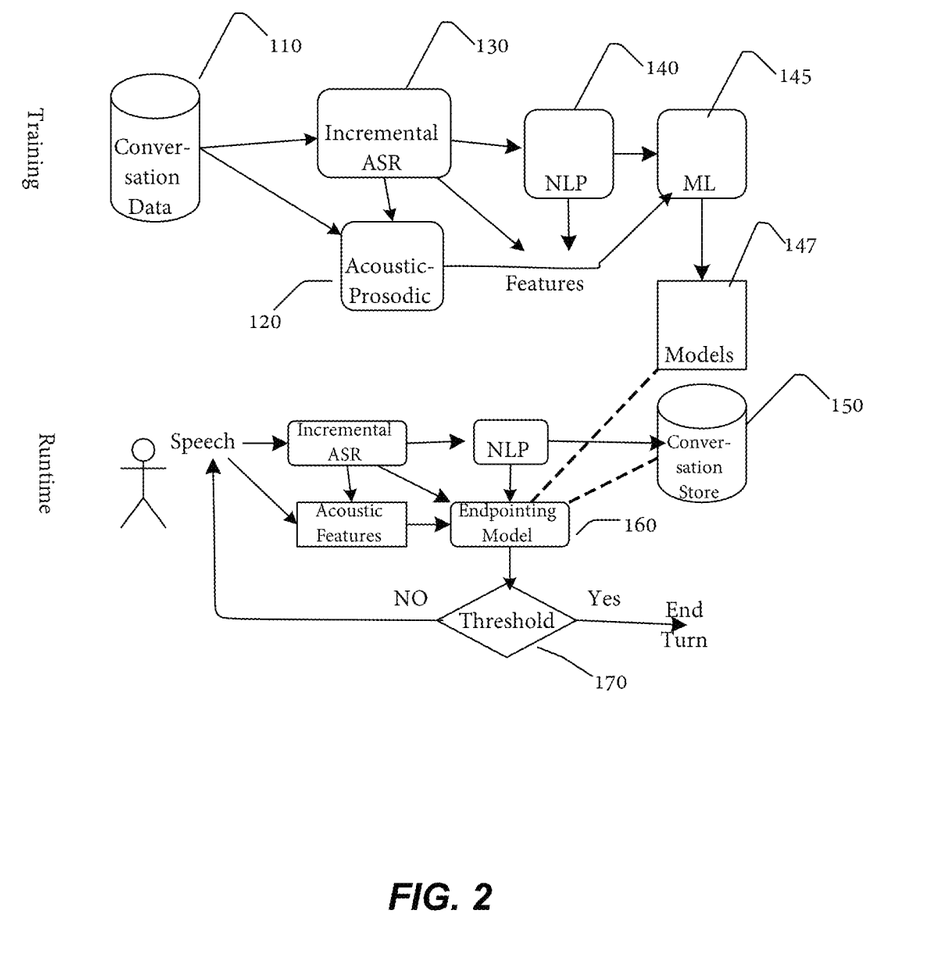
FIG. 2 depicts a system architecture of the endpointing system of FIG. 1, according to some embodiments.

FIG. 2 depicts a system architecture 200 of the endpointing system 101 of FIG. 1, according to some embodiments. The system architecture 200 includes the conversation database 110, the acoustic-prosodic model 120, the ASR model 130, the NLP model 140, the model training engine 145, various trained models 147 (including endpointing model 160), and the threshold module 170 of the endpointing system 101. In alternative configurations, different, fewer, and/or additional components may be included in the system architecture 200.

In order to improve turn taking between an automated system and a human, the endpointing system described herein uses a wide variety of information, as shown in FIG. 2. The invention uses natural language processing to extract semantic information (e.g., entities and/or intents) from text produced by the incremental ASR (Automated Speech Recognition). An endpointing confidence score is associated with each incremental result. The endpointing system is based on reaching a threshold that takes into account incremental NLP results and their associated confidence as well as prosodic clues such as filled and silent pauses, and the shape of pitch and energy contours (e.g., as determined by the acoustic-prosodic model 120).

In some embodiments, a statistical model can be trained using a previously annotated dataset with incremental steps. These steps depend on the incremental speech recognition setting. For example, with each additional word (or a specific number of words, or a pause in speech) that is recognized by the endpointing system, a new score is calculated. The goal of this model is to predict an endpointing score, which shows how confident the system is that the utterance has been captured (i.e., that the user is finished with their utterance).

FIG. 2 shows the training and runtime phases of the endpointing system 101. The conversation database 110 stores annotated conversational data for training the models 147, where at each increment (e.g., after each word or pause), conversations are labeled with accurate or inaccurate endpointing. (i.e., if the utterance should be endpointed at that time or not).

The training data from the conversation database 110 can be selected from conversations between humans and a VA. Conventional VA systems that are unable to determine likely endpoints in user utterances apply long timeout periods. In this approach to making sure the user's entire utterance is captured and the system doesn't interrupt the user, complete conversations are captured and annotated for training. Alternatively or additionally, the training data stored in the conversation database 110 can include conversational data between a human user and a human agent (e.g., a customer service representative).

For both training and runtime, at each incremental step, the endpointing system 101 can determine speech attributes, including acoustic-prosodic attributes determined by the acoustic-prosodic model 120, that can be directly extracted from speech. The speech attributes may also be obtained by reusing acoustic-prosodic attributes that are used for ASR. For example, although not depicted, acoustic-prosodic attributes output from the acoustic-prosodic model 120 may be input into the ASR model 130 to output ASR text. Further yet, the speech attributes may also include the recognized speech output by the ASR model 130 (e.g., incremental ASR text and confidence scores). Using the NLP model 140, the endpointing system extracts NLP results with confidence scores based on incremental ASR text. The endpointing system can use machine learning to determine an endpoint in a user utterance increment, training endpointing models 147 using the model training engine 145. Furthermore, the conversational/dialogue context could also be taken into account to build an endpointing model, where depending on the dialog state, utterances, and semantics information captured so far from the previous turns of a conversation (e.g., the conversation history stored in data store 150), the endpointing model 160 outputs different confidence scores.

At runtime, at each incremental step, the final result of the endpointing system is compared with the endpointing model threshold, at the threshold module 170, to decide on the end of the utterance. The output of the endpointing model 160 is a score at each step, which is used to decide whether or not the utterance is completed. The threshold for endpointing could be set based on an annotated test set.

Figure 3:
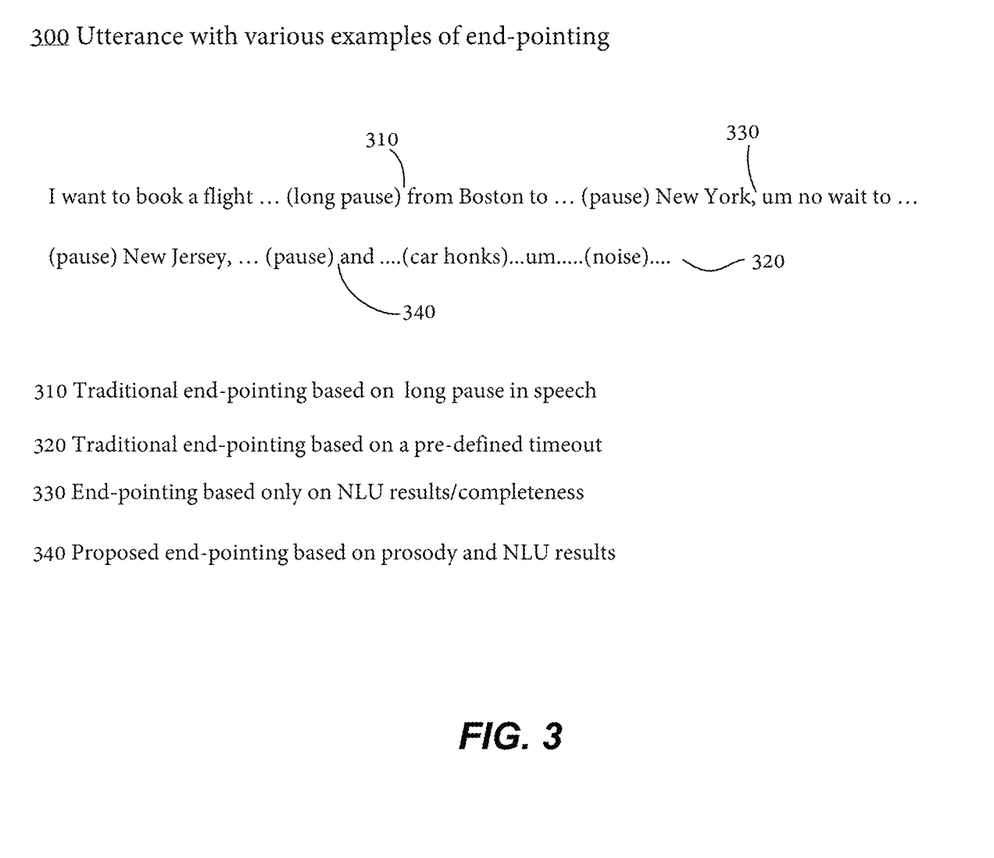
FIG. 3 is an example user utterance in which an utterance endpoint is determined, according to some embodiments.

FIG. 3 illustrates an example user utterance 300 in which an utterance endpoint is determined, according to some embodiments. The outcomes of four different types of utterance endpointing annotate the user utterance 300: traditional endpointing 310 based on a long pause in speech, traditional endpointing 320 based on a pre-defined timeout, endpointing 330 based only on NLU results or completeness, and endpointing 340 based on prosody and NLU results. Traditional systems use a fixed timeout or pause information to endpoint utterance 300, so the captured information is incomplete or wrong. A pause-based endpointing technique is shown by endpointing 310 that captures "I want to book a flight." Endpointing 310 determines whether a pause lasts longer than a predefined threshold and if so, the utterance will be endpointed before the utterance is complete. In endpointing 310, this causes the departure and arrival information to not be captured. Another example of traditional endpointing 320, based on a predefined timeout, the natural language system may wait past the end of the utterance. This wait may cause the system to record noise and other unimportant information which may waste processing resources.

If only NLP information is used for completeness, the utterance will be endpointed after "New York." This is demonstrated by endpointing 330. Because the departure and arrival information are captured and with a filler word of "um", the system will not predict that the utterance will continue. However, if in addition to NLP information, the continuous prosodic features are also considered, a rising pitch contour can show that the speaker is not finished after "New York," and the system continues listening until the end of "New Jersey." This is shown in endpointing 340, which is the accurate endpointing for this utterance. The remainder of the utterance 300 does not include any important information for the natural language system and thus, the endpointing 340 enables the system to avoid unnecessary processing of audio that does not carry information.

Figure 4:
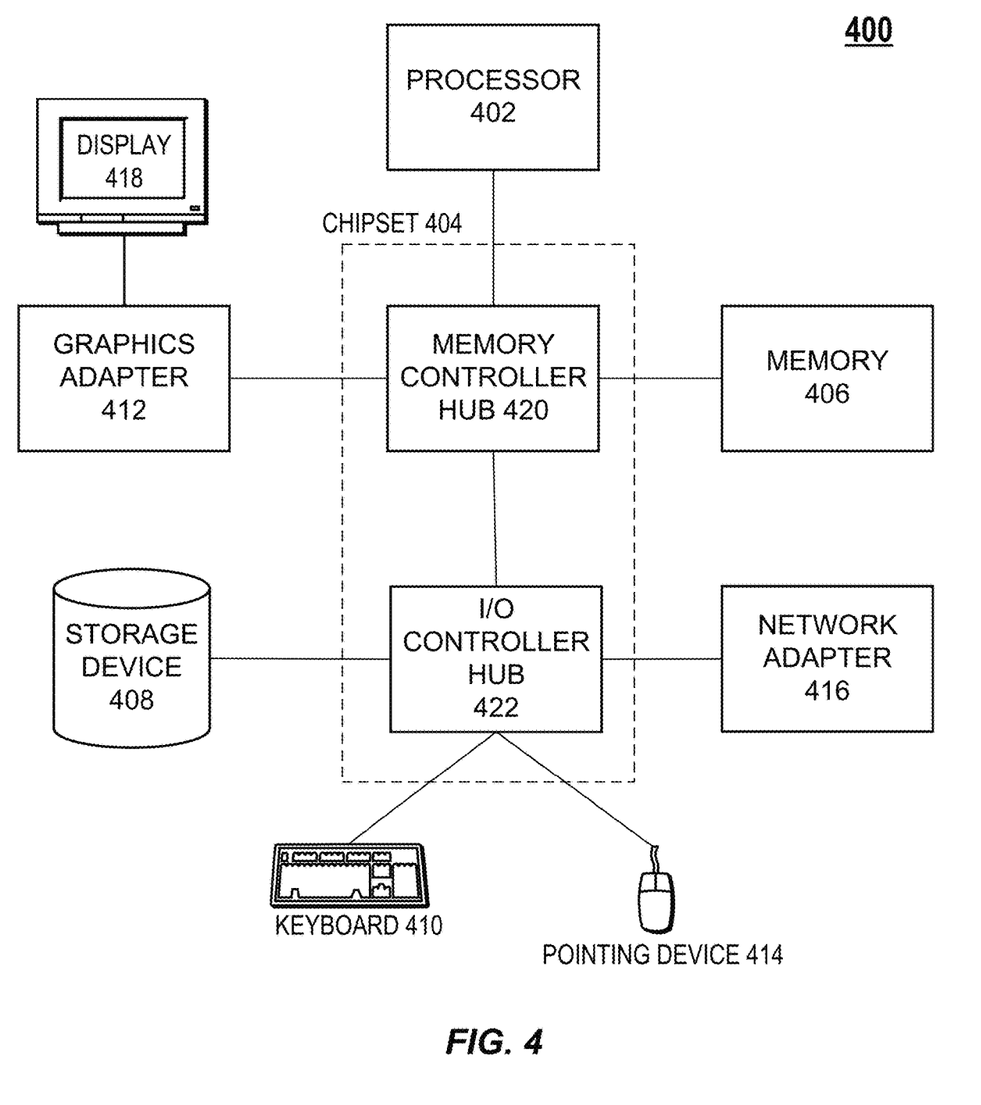
FIG. 4 is a high-level block diagram illustrating physical components of a computer used as part or all of the end-pointing system of FIG. 1, according to one embodiment.

FIG. 4 is a high-level block diagram illustrating physical components of a computer 400 used as part or all of the NLU system 100 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method performed by a task-oriented dialog system, the method comprising:
   receiving, in real time, a user utterance provided during a task-oriented communication session between a user and a virtual agent (VA); and
   for each incremental portion of a sequence of incremental portions of the user utterance, wherein consecutive incremental portions in the sequence are demarcated in the utterance by a pause and expand to include newly-uttered words in the user utterance:
      recognizing a plurality of words in the incremental portion using an automated speech recognition (ASR) model;
      applying a natural language processing (NLP) model to the plurality of words to generate semantic information for the incremental portion of the user utterance, the semantic information comprising information describing parts of speech and relationships between the parts of speech;
      generating an acoustic-prosodic signature of the incremental portion of the user utterance using an acoustic-prosodic model;
      generating a feature vector representative of at least the plurality of words, the semantic information, and the acoustic-prosodic signature;
      applying a trained model to the feature vector, the trained model configured to determine a confidence score indicative of a likelihood that the incremental portion of the user utterance includes an endpoint of the user utterance; and
      in response to the confidence score meeting or exceeding a threshold score indicating that the incremental portion of the user utterance includes the endpoint of the user utterance, causing the VA to generate a response utterance to respond to the user.

2. The computer-implemented method of claim 1, wherein the trained model is trained by:
   accessing a first set of utterance data from a plurality of task-oriented communication sessions, the first set of utterance data annotated with a first plurality of labels in incremental steps indicating whether a historical user reached a historical endpoint at each step of the incremental steps; and
   training a model using the first set of utterance data.

3. The computer-implemented method of claim 2, wherein the trained model is further trained by:
   receiving feedback indicating a measure of approval with the determined confidence score;
   annotating a second set of utterance data with a second plurality of labels determined based on the received feedback, the second set of utterance data comprising the user utterance of the task-oriented communication session between the user and the VA; and
   training the model using the second set of utterance data.

4. The computer-implemented method of claim 2, wherein the plurality of task-oriented communication sessions used to train the trained model are human-agent conversations without timeout limits, wherein a timeout limit is used by a given VA to determine that the historical endpoint has been reached after a predetermined period of time has passed since the historical user's last user utterance.

5. The computer-implemented method of claim 2, wherein the plurality of task-oriented communication sessions used to train the trained model include utterances exclusively from a plurality of users within one or more of a particular geographical region or age group.

6. The computer-implemented method of claim 1, wherein causing the VA to generate the response utterance to respond to the user comprises determining the response utterance using a dialog manager in the task-oriented dialog system, the dialog manager configured to receive an indication that the endpoint has been reached and based on a dialog history of the VA with the user, perform at least one of determining the response utterance or executing a task requested by the user.

7. The computer-implemented method of claim 1, further comprising:
   determining the threshold score based on one or more of an annotated evaluation set of utterances and a user-specified accuracy of the trained model, wherein the annotated evaluation set of utterances comprises historical utterances labeled in word-level increments whether a historical user reached a historical endpoint at each of the word-level increments; and
   in response to determining a number of conversational turns taken to execute a task requested by the user exceeds an average number of conversational turns for a task type of the task:
      switching from a default of using pause-level increments to using word-level increments, and
      applying the trained model to another feature vector generated based on applications of the NLP model and the acoustic-prosodic model to word-level incremental portions of the user utterance, wherein the word-level incremental portions of the user utterance are demarcated by each word in the user utterance.

8. The computer-implemented method of claim 1, further comprising, in response to the confidence score failing to meet a threshold score, the failure indicating that the likelihood that the given portion of the user utterance does not include the endpoint of the utterance:

receiving an additional portion of the user utterance to determine, using the trained model, whether the additional portion includes the endpoint of the utterance; and generating an additional feature vector using the received additional portion and applying the trained model to the additional feature vector to determine that the additional portion includes the endpoint of the user utterance.

9. The computer-implemented method of claim 1, further comprising determining a dialog state using the semantic information of the user utterance or historical semantic information of historical user utterances stored in a short term memory, wherein the plurality of feature vectors are further representative of the dialog state.

10. The computer-implemented method of claim 1, further comprising:
accessing a dialog history comprising a plurality of historical user utterances, the dialog history annotated with corresponding semantic information for the plurality of historical user utterances; and
wherein the plurality of feature vectors are further representative of the corresponding semantic information for the plurality of historical user utterances.

11. The computer-implemented method of claim 1, wherein the NLP model outputs an NLP confidence score associated with the generated semantic information, and wherein the feature vector is further representative of the NLP confidence score.

12. The computer-implemented method of claim 1, wherein the ASR model outputs an ASR confidence score associated with the plurality of words, and wherein the feature vector is further representative of the ASR confidence score.

13. A non-transitory computer-readable storage medium storing instructions that when executed by a computer processor cause the computer processor to perform steps comprising:
receiving, in real time, a user utterance provided during a task-oriented communication session between a user and a virtual agent (VA); and
for each incremental portion of a sequence of incremental portions of the user utterance, wherein consecutive incremental portions in the sequence are demarcated in the utterance by a pause and expand to include newly-uttered words in the user utterance:
recognizing a plurality of words in the incremental portion using an automated speech recognition (ASR) model;
applying a natural language processing (NLP) model to the plurality of words to generate semantic information for the incremental portion of the user utterance, the semantic information comprising information describing parts of speech and relationships between the parts of speech;
generating an acoustic-prosodic signature of the incremental portion of the user utterance using an acoustic-prosodic model;
generating a feature vector representative of at least the plurality of words, the semantic information, and the acoustic-prosodic signature;
applying a trained model to the feature vector, the trained model configured to determine a confidence score indicative of a likelihood that the incremental portion of the user utterance includes an endpoint of the user utterance; and
in response to the confidence score meeting or exceeding a threshold score indicating that the incremental portion of the user utterance includes the endpoint of the user utterance, causing the VA to generate a response utterance to respond to the user.

14. The non-transitory computer-readable storage medium of claim 13, wherein the steps further comprise:
determining the threshold score based on one or more of an annotated evaluation set of utterances and a user-specified accuracy of the trained model, wherein the annotated evaluation set of utterances comprises historical utterances labeled in word-level increments whether a historical user reached a historical endpoint at each of the word-level increments; and
in response to determining a number of conversational turns taken to execute a task requested by the user exceeds an average number of conversational turns for a task type of the task:
switching from a default of using pause-level increments to using word-level increments, and
applying the trained model to another feature vector generated based on applications of the NLP model and the acoustic-prosodic model to word-level incremental portions of the user utterance, wherein the word-level incremental portions of the user utterance are demarcated by each word in the user utterance.

15. The non-transitory computer-readable storage medium of claim 13, wherein:
the NLP model outputs a NLP confidence scores associated with the generated semantic information of the incremental portions of the user utterance;
the plurality of feature vectors are further representative of the NLP confidence scores;
the ASR model outputs ASR confidence scores associated with the plurality of words; and
the plurality of feature vectors are further representative of the ASR confidence scores.

16. The non-transitory computer-readable storage medium of claim 13, wherein the trained model is trained by:
accessing a first set of utterance data from a plurality of task-oriented communication sessions, the first set of utterance data annotated with a first plurality of labels in incremental steps indicating whether a historical user reached a historical endpoint at each step of the incremental steps; and
training a model using the first set of utterance data.

17. A computer system comprising:
a computer processor; and
a non-transitory computer-readable storage medium storing instructions that when executed by the computer processor cause the computer processor to perform steps comprising:
receiving, in real time, a user utterance provided during a task-oriented communication session between a user and a virtual agent (VA); and
for each incremental portion of a sequence of incremental portions of the user utterance, wherein consecutive incremental portions in the sequence are demarcated in the utterance by a pause and expand to include newly-uttered words in the user utterance:
recognizing a plurality of words in the incremental portion using an automated speech recognition (ASR) model;
applying a natural language processing (NLP) model to the plurality of words to generate semantic information for the incremental portion of the user utterance, the semantic information comprising information describing parts of speech and relationships between the parts of speech;

generating an acoustic-prosodic signature of the incremental portion of the user utterance using an acoustic-prosodic model;

generating a feature vector representative of at least the plurality of words, the semantic information, and the acoustic-prosodic signature;

applying a trained model to the feature vector, the trained model configured to determine a confidence score indicative of a likelihood that the incremental portion of the user utterance includes an endpoint of the user utterance; and in response to the confidence score meeting or exceeding a threshold score indicating that the incremental portion of the user utterance includes the endpoint of the user utterance, causing the VA to generate a response utterance to respond to the user.

18. The system of claim 17, wherein the steps further comprise:

determining the threshold score based on one or more of an annotated evaluation set of utterances and a user-specified accuracy of the trained model, wherein the annotated evaluation set of utterances comprises historical utterances labeled in word-level increments whether a historical user reached a historical endpoint at each of the word-level increments; and in response to determining a number of conversational turns taken to execute a task requested by the user exceeds an average number of conversational turns for a task type of the task:

switching from a default of using pause-level increments to using word-level increments, and applying the trained model to another feature vector generated based on applications of the NLP model and the acoustic-prosodic model to word-level incremental portions of the user utterance, wherein the word-level incremental portions of the user utterance are demarcated by each word in the user utterance.

19. The system of claim 17, wherein:

the NLP model outputs a NLP confidence scores associated with the generated semantic information of the incremental portions of the user utterance;

the plurality of feature vectors are further representative of the NLP confidence scores;

the ASR model outputs ASR confidence scores associated with the plurality of words; and the plurality of feature vectors are further representative of the ASR confidence scores.

20. The system of claim 17, wherein the trained model is trained by:

accessing a first set of utterance data from a plurality of task-oriented communication sessions, the first set of utterance data annotated with a first plurality of labels in incremental steps indicating whether a historical user reached a historical endpoint at each step of the incremental steps; and training a model using the first set of utterance data.

* * * * *